(12) United States Patent
Kim et al.

(10) Patent No.: US 10,526,712 B2
(45) Date of Patent: Jan. 7, 2020

(54) CUTTING TOOL

(71) Applicant: KORLOY INC., Seoul (KR)

(72) Inventors: Yong-hyun Kim, Cheongju-si (KR);
Jung-wook Kim, Cheongju-si (KR);
Sung-Gu Lee, Cheongju-si (KR);
Sun-Yong Ahn, Cheongju-si (KR)

(73) Assignee: KORLOY INC., Seoul (KR)

( * ) Notice: Subject to any disclaimer, the term of this patent is extended or adjusted under 35 U.S.C. 154(b) by 244 days.

(21) Appl. No.: 15/517,166

(22) PCT Filed: Nov. 10, 2015

(86) PCT No.: PCT/KR2015/012054
§ 371 (c)(1),
(2) Date: Apr. 6, 2017

(87) PCT Pub. No.: WO2016/104943
PCT Pub. Date: Jun. 30, 2016

(65) Prior Publication Data
US 2017/0306500 A1 Oct. 26, 2017

(30) Foreign Application Priority Data
Dec. 24, 2014 (KR) .................. 10-2014-0187929

(51) Int. Cl.
*B23B 27/14* (2006.01)
*C23C 28/04* (2006.01)
(Continued)

(52) U.S. Cl.
CPC .............. *C23C 28/044* (2013.01); *B22F 7/08* (2013.01); *B23B 27/148* (2013.01); *C22C 29/08* (2013.01);
(Continued)

(58) Field of Classification Search
USPC .......... 51/307, 309; 428/336, 472, 698, 699, 428/701, 702
See application file for complete search history.

(56) References Cited

U.S. PATENT DOCUMENTS 4,497,874 A * 2/1985 Hale ................... C23C 16/0209
428/698
4,548,786 A * 10/1985 Yohe ...................... C23C 10/00
75/244
(Continued)

FOREIGN PATENT DOCUMENTS

JP 09-309007 A 12/1997
JP 2005-103657 A 4/2005
(Continued)

OTHER PUBLICATIONS

International Search Report for PCT/KR2015/012054 dated Feb. 26, 2016 from Korean Intellectual Property Office.

*Primary Examiner* — Archene A Turner
(74) *Attorney, Agent, or Firm* — Revolution IP, PLLC (57) ABSTRACT

A cutting tool comprises a base material which includes particles including a tungsten carbide (WC) as a main component, a binder phase including cobalt (Co) as a main component, and particles including a carbide or a carbonitride of at least one selected from the group consisting of Group 4a, 5a, and 6a elements, or a solid solution thereof; and a hard film formed on the base material, wherein the hard film comprises at least an alumina layer, a cubic phase free layer (CFL), in which the carbide or the carbonitride is not formed, is formed from a surface of the base material to a depth of 10 μm to 50 μm, and a Co content of a surface of the CFL is 80% or more of a maximum Co content of the CFL.

3 Claims, 5 Drawing Sheets

(51) Int. Cl.
  *C22C 29/08*   (2006.01)
  *B22F 7/08*    (2006.01)
  *B22F 5/00*    (2006.01)

(52) U.S. Cl.
  CPC ...... *C23C 28/042* (2013.01); *B22F 2005/001* (2013.01); *B23B 2228/04* (2013.01); *B23B 2228/105* (2013.01); *B23B 2228/36* (2013.01); *C22C 2204/00* (2013.01)

(56)  References Cited

U.S. PATENT DOCUMENTS

| | | | | |
|---|---|---|---|---|
| 4,610,931 A | * | 9/1986 | Nemeth | C22C 29/04 |
| | | | | 75/240 |
| 4,812,370 A | * | 3/1989 | Okada | C22C 29/02 |
| | | | | 428/552 |
| 5,576,093 A | * | 11/1996 | Yoshimura | C23C 30/005 |
| | | | | 51/309 |
| 5,649,279 A | * | 7/1997 | Gustafson | C22C 1/051 |
| | | | | 419/25 |
| 5,955,186 A | * | 9/1999 | Grab | C23C 30/005 |
| | | | | 51/307 |
| 6,344,264 B1 | * | 2/2002 | Lenander | C22C 29/08 |
| | | | | 428/698 |
| 6,638,474 B2 | * | 10/2003 | Liu | C22C 1/055 |
| | | | | 419/14 |
| 7,192,637 B2 | * | 3/2007 | Ruppu | C22C 29/08 |
| | | | | 428/336 |
| 2004/0161639 A1 | | 8/2004 | Fukano et al. | |
| 2004/0197582 A1 | * | 10/2004 | Larsson | C23C 30/005 |
| | | | | 428/472 |
| 2009/0297835 A1 | | 3/2009 | Okada et al. | |

FOREIGN PATENT DOCUMENTS

| | | |
|---|---|---|
| JP | 2013-188833 A | 9/2013 |
| KR | 10-2005-0110822 A | 11/2005 |
| KR | 10-2007-0085526 A | 8/2007 |

* cited by examiner

CUTTING TOOL

CROSS REFERENCE TO PRIOR APPLICATIONS

This application is a National Stage Application of PCT International Patent Application No. PCT/KR2015/012054 filed on Nov. 10, 2015, under 35 U.S.C. § 371, which claims priority to Korean Patent Application No. 10-2014-0187929 filed on Dec. 24, 2014, which are all hereby incorporated by reference in their entirety.

TECHNICAL FIELD

The present invention relates to a cutting tool in which a hard film is formed on a surface of a base material, and more particularly, to a cutting tool suitable for high-speed feed and high-speed machining manufactured by forming a hard film on a base material including a cubic phase free layer (CFL) in which differences between a cobalt (Co) content of a surface, a Co content in the base material, and a maximum Co content of the CFL are minimized.

BACKGROUND ART

Cemented carbides for cutting tools, as composite materials of a WC hard phase and a cobalt (Co) binder metal phase, are representative dispersion alloys, wherein their mechanical properties depend on a particle diameter of the WC hard phase and an amount of the Co binder metal phase, hardness and toughness are particularly in an inversely proportional relationship to each other, properties required for the cemented carbides for cutting tools vary according to machining methods, and accordingly, various attempts have been made to control the mechanical properties of the cemented carbides.

Recently, in machining market, there is a growing demand for a shorter cycle time to improve competitiveness through cost reduction. In order to reduce the cycle time, since machining conditions are gradually changed to high-speed, high-feed conditions, there is an increasing need to allow physical properties of the corresponding cutting tool to have characteristics in which both wear resistance and toughness are good at the same time so that good machining may be performed even under the high-speed, high-feed conditions.

Accordingly, with respect to a hard coating coated on the cutting tool, a coating including an alpha-phase alumina layer, which has excellent stability at high temperature, has been preferred, and, with respect to a MT-TiCN layer formed as an underlayer of the alumina layer, a fine and uniform columnar structure has been preferred due to a trend towards high hardness.

In a case in which non-uniform plastic deformation occurs in a base material of the cutting tool, since chipping easily occurs in a high-hardness film formed on the base material, stability of base material characteristics in a direction perpendicular to the film is required to allow physical properties of the high-hardness film to be fully exhibited.

In a surface portion of the base material on which the hard film is formed, a layer (Cubic phase Free Layer, hereinafter, referred to as "CFL"), in which a cubic carbide constituting the base material is not present, is formed from a surface to a depth of about 10 μm to about 40 μm so as to absorb an impact generated during machining as disclosed in a patent document (Korean Patent Application Laid-open Publication No. 2005-0110822), wherein uniformity of the CFL (uniformity of microstructure by location, uniformity of composition by location) is required for obtaining high hardness of the above-described film.

However, in a CFL of a current commercially available cemented carbide, differences in composition are large, for example, an amount of Co is changed up to about 2 times from a surface of a base material to the inside thereof, and, with respect to hardness of the CFL, differences in hardness between the surface, the CFL, and the inside of the base material are very large according to the large differences in the amount of Co.

Since the significant differences in the composition and hardness according to a thickness of the CFL reduce the stability of the base material, it may be a cause of deteriorating the properties of the high-hardness film formed on the base material. Thus, recently, research and development focusing on reducing the thickness of the CFL are being conducted.

However, since the CFL is basically for absorbing the impact during the machining, the absorption of the impact is reduced to reduce impact resistance of the cutting tool when the thickness of the CFL is significantly reduced. As a result, lifetime of the cutting tool may be reduced.

DISCLOSURE OF THE INVENTION

Technical Problem

The purpose of the present invention is to address limitations due to a cubic phase free layer (CFL) during the formation of a high-hardness film, wherein a cutting tool suitable for high-speed feed and high-speed machining is provided by forming a hard film on a base material, which is composed of particles including a tungsten carbide (WC) as a main component and a binder phase including Co as a main component, including the CFL in which a difference between a cobalt (Co) content of a surface of the base material and a maximum Co content of the CFL is minimized.

Technical Solution

According to an embodiment of the present invention, there is provided a cutting tool which includes particles including a tungsten carbide (WC) as a main component, a binder phase including cobalt (Co) as a main component, and particles including a carbide or a carbonitride of at least one selected from the group consisting of Group 4a, 5a, and 6a elements, or a solid solution thereof; and a hard film formed on the base material, wherein the hard film includes at least an alumina layer, a cubic phase free layer (CFL), in which the carbide or the carbonitride is not formed, is formed from a surface of the base material to a depth of 10 μm to 50 μm, and a Co content of a surface of the CFL is 80% or more of a maximum Co content of the CFL.

According to the above configuration, since a difference between the maximum Co content of the CFL and the Co content of the surface of the base material is 20% or less of the maximum Co content of the CFL, non-uniformity of the Co content of the CFL is reduced and, as a result, non-uniformity of hardness due to a thickness of the CFL is significantly reduced. Accordingly, since non-uniformity of a surface portion of the base material is reduced even if an underlayer and an alumina layer formed on the CFL are formed as a high-hardness film, it does not adversely affect chipping resistance of the high-hardness film even if the thickness of the CFL is not reduced. Simultaneously, since the thickness of the CFL absorbing an impact may be maintained relatively large, impact resistance during machining may also be maintained.

Advantageous Effects

Since a base material constituting a cutting tool according to an embodiment of the invention may include a cubic phase free layer (CFL) in which differences in Co content and hardness between the surface and the inside of the CFL are small, machining performance may be maintained even if a relatively thick CFL is formed while a high-hardness film is formed. Thus, excellent wear resistance and impact resistance suitable for high-speed feed and high-speed machining may be provided.

MODE FOR CARRYING OUT THE INVENTION

Hereinafter, embodiments of the invention will be described in detail with reference to the accompanying drawings. However, the invention may be embodied in many different forms and should not be construed as being limited to the embodiments set forth herein. Rather, these embodiments are provided so that this description will be thorough and complete, and will fully convey the scope of the invention to those skilled in the art.

In the invention, the expression "Cubic phase Free Layer (CFL)" denotes a surface region in which a binder phase is rich and a cubic carbide phase is absent from a surface of a base material composed of a cemented carbide sintered body to a predetermined depth.

Also, the expression "inside of the base material" denotes a portion in which a cobalt (Co) composition becomes constant in a region outside the CFL.

A cutting tool according to an embodiment of the invention includes a base material, which includes particles including a tungsten carbide (WC) as a main component, a binder phase including cobalt (Co) as a main component, and particles including a carbide or a carbonitride of at least one selected from the group consisting of Group 4a, 5a, and 6a elements, or a solid solution thereof; and a hard film formed on the base material, wherein the hard film includes at least an alumina layer, a cubic phase free layer (CFL), in which the carbide or the carbonitride is not formed, is formed from a surface of the base material to a depth of 10 µm to 50 µm, and a Co content of a surface of the CFL is 80% or more of a maximum Co content of the CFL.

That is, a difference between the maximum Co content of the CFL and the Co content of the surface of the CFL formed on a surface portion of the base material constituting the cutting tool according to the embodiment of the invention is a maximum of 20% or less of the maximum Co content of the CFL, wherein, since the small difference between the Co content of the surface and the maximum Co content of the CFL significantly reduces non-uniformity and a difference in hardness of the entire CFL, a lower portion of a high-hardness film formed on the base material becomes uniform during machining and the CFL may firmly support the high-hardness film in comparison to a conventional CFL. Thus, chipping of the high-hardness film may be significantly reduced. Accordingly, since the chipping of the high-hardness film is not only significantly increased even if a thickness of the CFL is increased but an impact may also be sufficiently absorbed during the machining, impact resistance as well as wear resistance may be well maintained.

A Co content of the base material excluding the CFL may be 75% or more of the maximum Co content of the CFL. Thus, the chipping of the high-hardness film formed on the base material may be further reduced by reducing the difference in the Co content between the CFL and the base material other than the CFL.

In a case in which an amount of the carbide or the carbonitride is less than 1.5 wt %, wear resistance and high-temperature characteristics of the base material during machining are reduced due to a decrease in hardness of the base material, and, in a case in which the amount of the carbide or the carbonitride is greater than 20 wt %, plastic deformability and chipping resistance during the machining are reduced. Thus, the amount of the carbide or the carbonitride may be in a range of 1.5 wt % to 20 wt %. Also, in a case in which an amount of the Co is less than 1 wt %, a breakage easily occurs due to a decrease in toughness, and, in a case in which the amount of the Co is greater than 12 wt %, the wear resistance is excessively low. Thus, the amount of the Co may be in a range of 1 wt % to 12 wt %.

Furthermore, a $TiC_xN_yO_z$ layer (x+y+z=1) having a single layer or multilayer structure may be included between the base material and the alumina layer, and an additive element, such as aluminum (Al), zirconium (Zr), and boron (B), may be included in the Ti(C,N,O) layer to improve physical properties of the Ti(C,N,O) layer or binding properties between the Ti(C,N,O) layer and the alumina layer formed on the Ti(C,N,O) layer.

Example 1

As a base material of the cutting tool according to the embodiment of the invention, 6 wt % of Co powder, 3 wt % of WTi carbonitride powder, 2 wt % of niobium (Nb) carbide powder, and WC powder as a remainder were mixed, and a cemented carbide was then manufactured by a sintering process.

The sintering process was performed by using a method in which a dewaxing process was performed by heat-treating at a low temperature of 250° C. for 2 hours, preliminary sintering was performed at 1,200° C. for 1 hour, main sintering was performed at 1,400° C. for 0.5 hour, and cooling was performed at a cooling rate of 10° C./min to room temperature.

A hard film was formed by sequentially stacking a 1 µm thick TiN layer, a 10 µm thick MT-TiCN layer, a 5 µm thick α-Al$_2$O$_3$ layer, and a 1 μm thick TiN layer on the base material of the manufactured cemented carbide by a well-known chemical vapor deposition (CVD) method.

Example 2

A cemented carbide base material was prepared in the same manner as in Example 1 of the invention, but a method was used in which, after the main sintering was performed, furnace cooling was performed until the temperature reached 1,300° C. and cooling was performed at a cooling rate of 10° C./min to room temperature.

In this case, a thickness of a CFL formed was about 30 μm, a Co content of the surface of the base material was about 83% of a maximum Co content of the CFL, and a Co content of the inside of the base material was about 77% of the maximum Co content of the CFL.

The same hard film as that of Example 1 of the invention was formed on the base material of the cemented carbide thus manufactured.

Comparative Example 1

As a base material of the cutting tool according to the embodiment of the invention, 6 wt % of Co powder, 3 wt % of WTi carbonitride powder, 2 wt % of Nb carbide powder, and WC powder as a remainder were mixed, and a cemented carbide was then manufactured by a sintering process.

The sintering process was performed by using a method in which a dewaxing process was performed by heat-treating at a low temperature of 200° C. for 2 hours, preliminary sintering was performed at 1,200° C. for 1 hour, main sintering was performed at 1,400° C. for 0.5 hour, and cooling was performed at a cooling rate of 5° C./min to room temperature.

The same hard film as that of Example 1 of the invention was formed on the base material of the cemented carbide thus manufactured.

Comparative Example 2

A cemented carbide base material was prepared in the same manner as in Comparative Example 1 of the invention, but a method was used in which, after the main sintering was performed, cooling was performed at a cooling rate of 20° C./min to room temperature.

In this case, a thickness of a CFL formed was about 20 μm, a Co content of the surface of the base material was about 60% of a maximum Co content of the CFL, and a Co content of the inside of the base material was about 55% of the maximum Co content of the CFL.

The same hard film as that of Example 1 of the invention was formed on the base material of the cemented carbide thus manufactured.

Comparative Example 3

A cemented carbide base material was prepared in the same manner as in Comparative Example 1 of the invention, but a method was used in which, after the main sintering was performed, furnace cooling was performed until the temperature reached 1,300° C. and cooling was performed at a cooling rate of 5° C./min to room temperature.

In this case, a thickness of a CFL formed was about 30 μm, a Co content of the surface of the base material was about 75% of a maximum Co content of the CFL, and a Co content of the inside of the base material was about 65% of the maximum Co content of the CFL.

The same hard film as that of Example 1 of the invention was formed on the base material of the cemented carbide thus manufactured.

Comparative Example 4

A cemented carbide base material was prepared in the same manner as in Comparative Example 1 of the invention, but a method was used in which, after the main sintering was performed, furnace cooling was performed until the temperature reached 1,300° C. and cooling was performed at a cooling rate of 20° C./min to room temperature.

In this case, a thickness of a CFL formed was about 30 μm, a Co content of the surface of the base material was about 68% of a maximum Co content of the CFL, and a Co content of the inside of the base material was about 63% of the maximum Co content of the CFL.

The same hard film as that of Example 1 of the invention was formed on the base material of the cemented carbide thus manufactured.

Co Composition and Hardness of the CFL and the Inside of the Base Material

Figure 1:
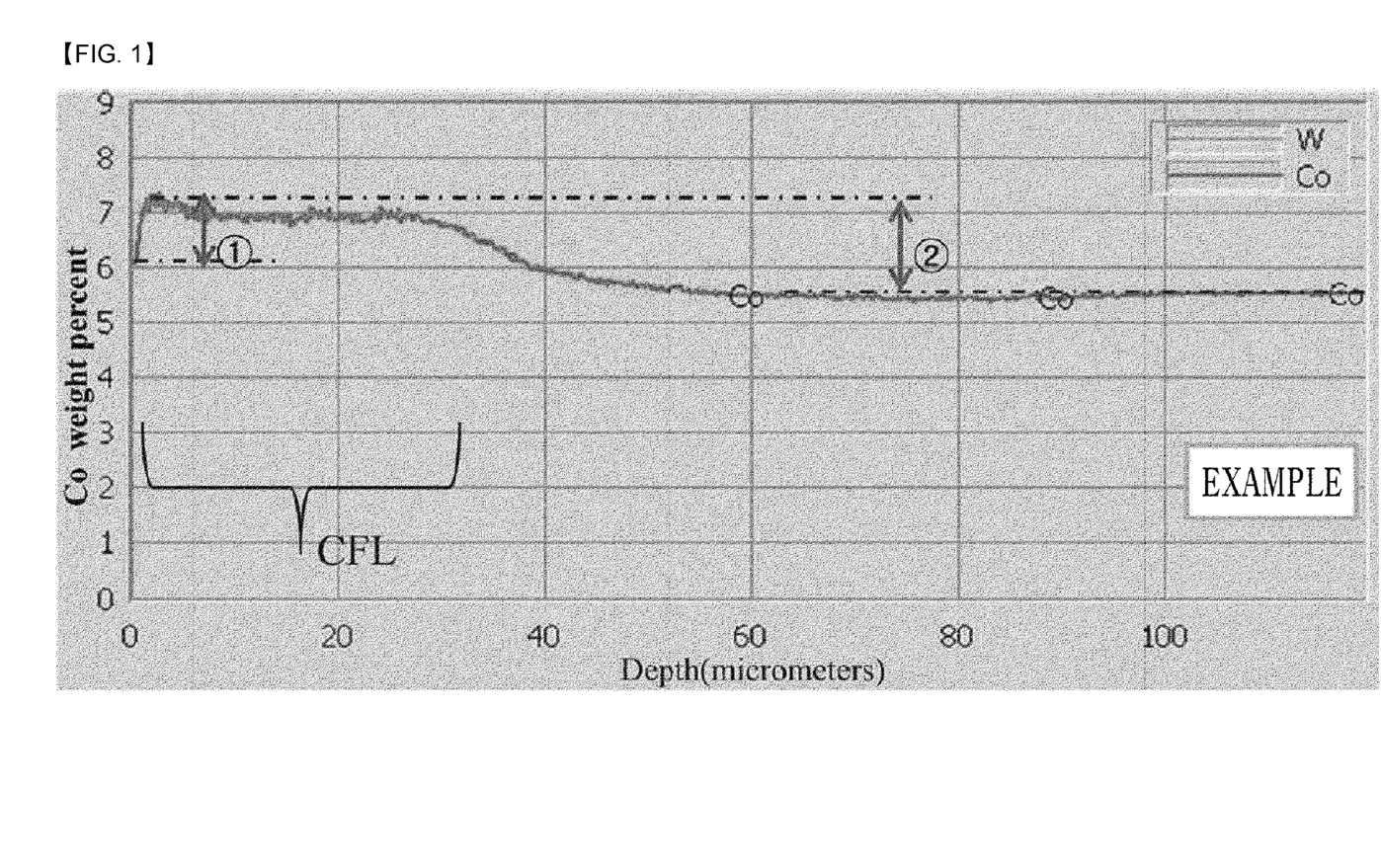
FIG. 1 illustrates a Co content measured from a surface portion of a cemented carbide base material according to Example 2 of the invention to a predetermined depth in the base material.

FIG. 1 illustrates a Co content measured from a surface portion of the base material of the cemented carbide according to Example 2 of the invention to a predetermined depth in the base material. As illustrated in FIG. 1, an about 30 μm thick CFL was formed in the surface portion of the cemented carbide according to the invention. With respect to the Co contents of the CFL and the inside of the base material, the Co content of the surface was low at about 6%, the Co content was rapidly increased to a depth of 2 μm to 3 μm from the surface to have a maximum Co content of about 7.3 wt % and then gradually decreased at a boundary of the CFL while gradually decreased, and the Co content of the inside of the base material indicated a constant value of about 5.6 wt %.

That is, the Co content of the surface of the cemented carbide according to Example 2 of the invention was about 83% of the maximum Co content of the CFL. Also, the Co content of the inside of the base material was about 77% of the maximum Co content of the CFL. Thus, with respect to the cemented carbide according to the embodiment of the invention, differences in the Co content between the surface, the CFL, and the inside of the base material were controlled to be small.

Figure 2:
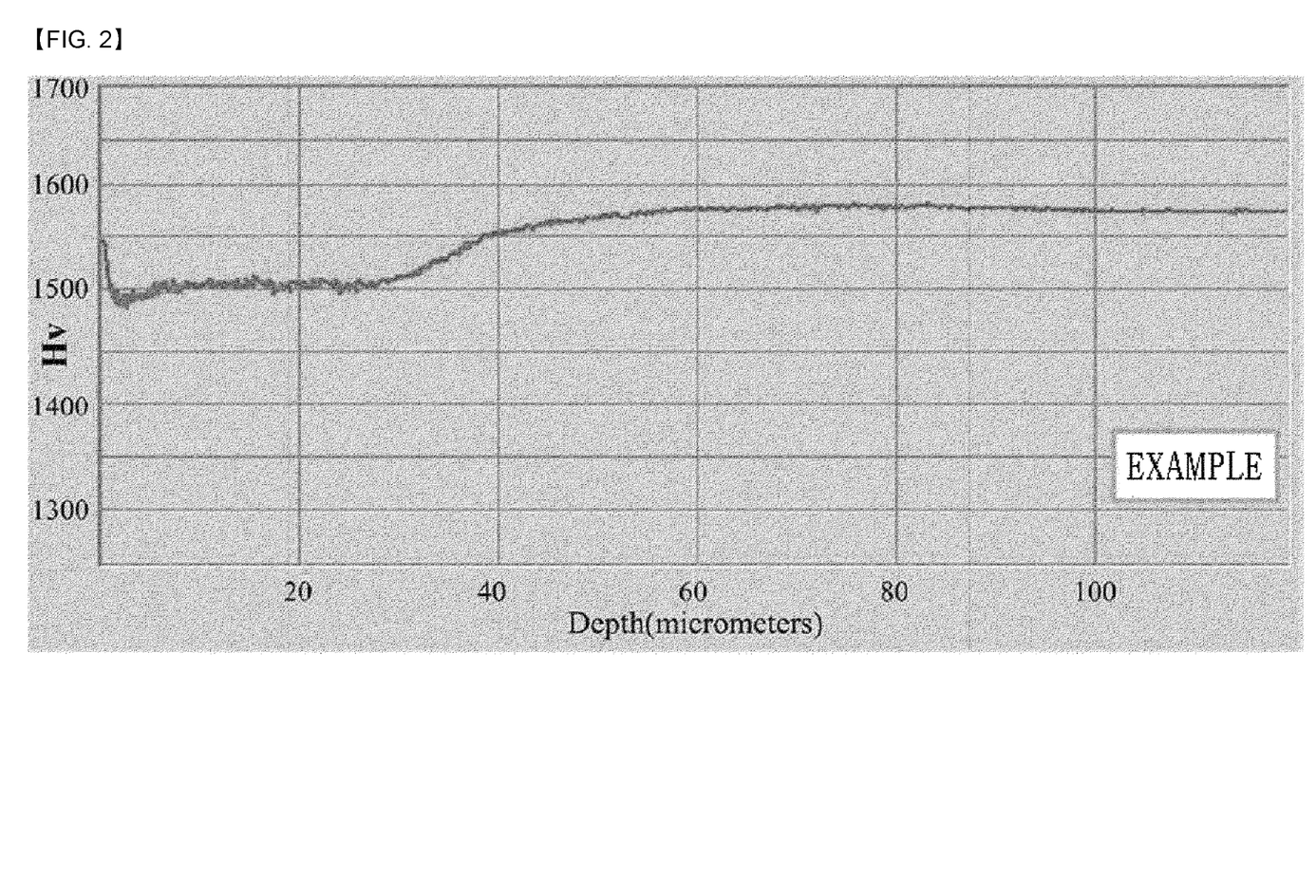
FIG. 2 illustrates hardness measured from the surface portion of the cemented carbide base material according to Example 2 of the invention to the predetermined depth in the base material.

FIG. 2 illustrates hardness measured from the surface portion of the base material of the cemented carbide according to Example 2 of the invention to the predetermined depth in the base material. As illustrated in FIG. 2, since the fact that the differences in the Co content were not large was directly reflected in the hardness of the cemented carbide base material, it may be understood that the lowest hardness was observed at a point where the Co content of the CFL was maximum, hardness higher than that of the CFL tended to be constantly maintained in the base material, and differences in the hardness between the inside of the base material, the CFL, and the surface of the base material were kept small.

Figure 3:
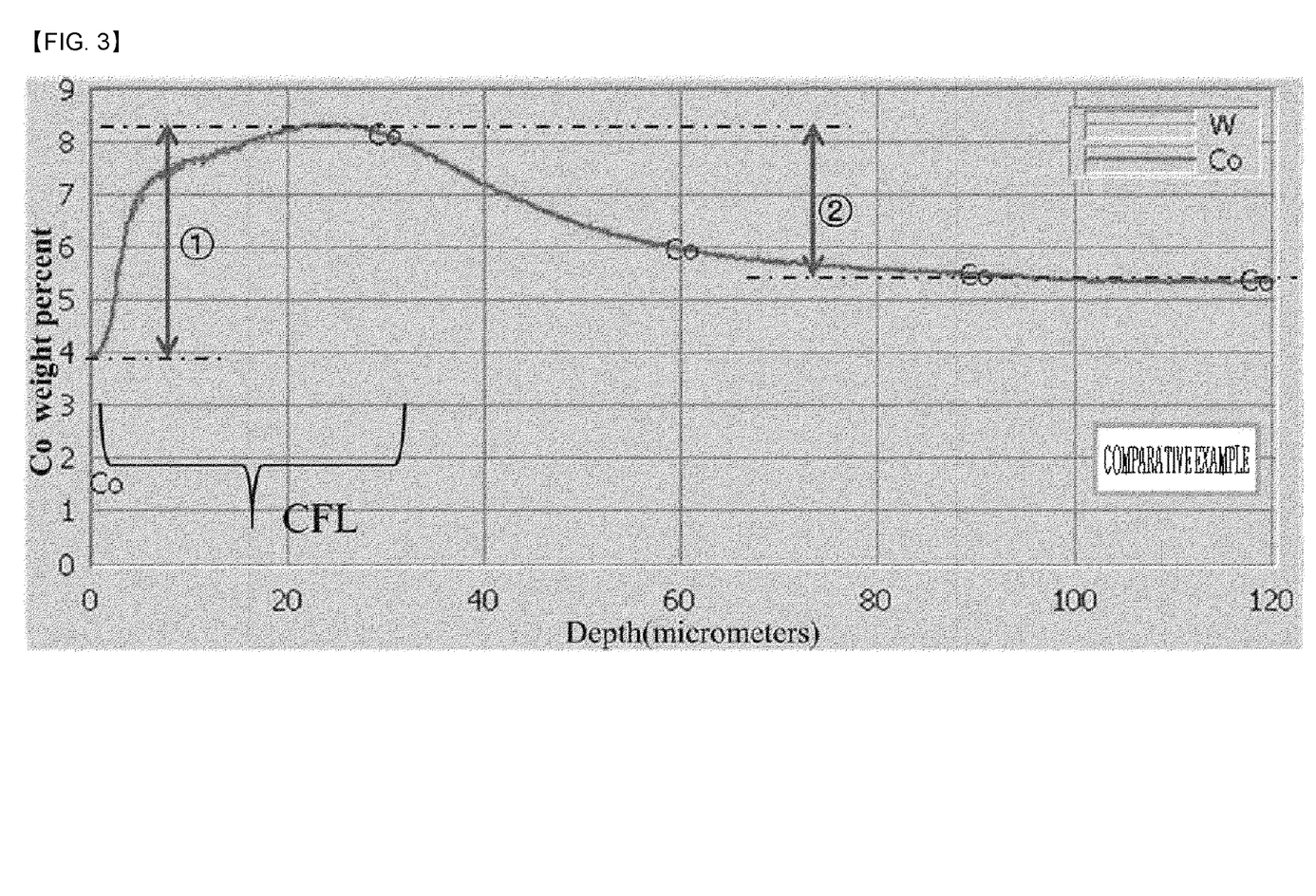
FIG. 3 illustrates a Co content measured from a surface portion of a base material of a cemented carbide for a cutting tool according to Comparative Example 3 to a predetermined depth in the base material.

FIG. 3 illustrates a Co content measured from a surface portion of the base material of the cemented carbide according to Comparative Example 3 to a predetermined depth in the base material. As illustrated in FIG. 3, an about 30 μm thick CFL was formed in the surface portion of the cemented carbide according to Comparative Example 3. With respect to the Co contents of the CFL and the inside of the base material, the Co content of the surface was low at about 4%, the Co content was increased to a depth of 30 μm from the surface to have a maximum Co content of about 8.2 wt % and then tended to be gradually decreased, and the Co content of the inside of the base material indicated a relatively constant value of about 5.7 wt %.

That is, different from Example 2 of the invention, the Co content of the surface of the cemented carbide according to comparative Example 3 was about 49% of the maximum Co content of the CFL. Also, the Co content of the inside of the base material was about 70% of the maximum Co content of the CFL. Thus, with respect to the cemented carbide according to the comparative example, it may be understood that differences in the Co content between the surface, the CFL, and the inside of the base material were relatively large.

Figure 4:
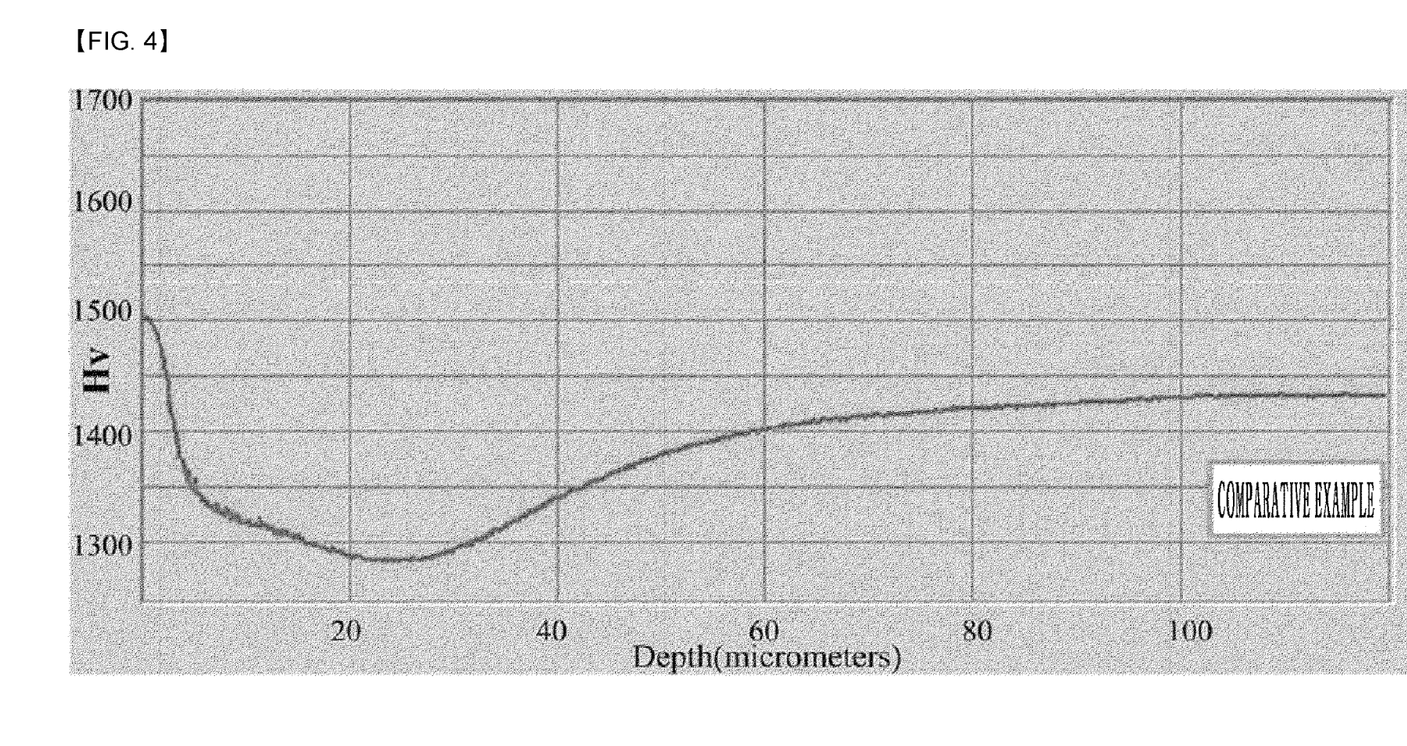
FIG. 4 illustrates hardness measured from the surface portion of the base material of the cemented carbide according to Comparative Example 3 to the predetermined depth in the base material.

FIG. 4 illustrates hardness measured from the surface portion of the base material of the cemented carbide according to Comparative Example 3 to the predetermined depth in the base material. As illustrated in FIG. 4, since the fact that the differences in the Co content between the surface, the CFL, and the inside of the base material of the cemented carbide according to Comparative Example 3 were relatively large was directly reflected in the hardness of the cemented carbide base material, it may be understood that differences in the hardness between the surface of the base material, the CFL, and the inside of the base material were relatively large.

With respect to each of the cemented carbides manufactured according to Examples 1 and 2 of the invention and Comparative Examples 1 to 4, a difference between the Co content of the surface of the base material and the maximum Co content of the CFL and a difference between the Co content of the base material other than the CFL and the maximum Co content of the CFL are presented in Table 1 below.

performance tests were performed under the following three conditions.

Figure 5:
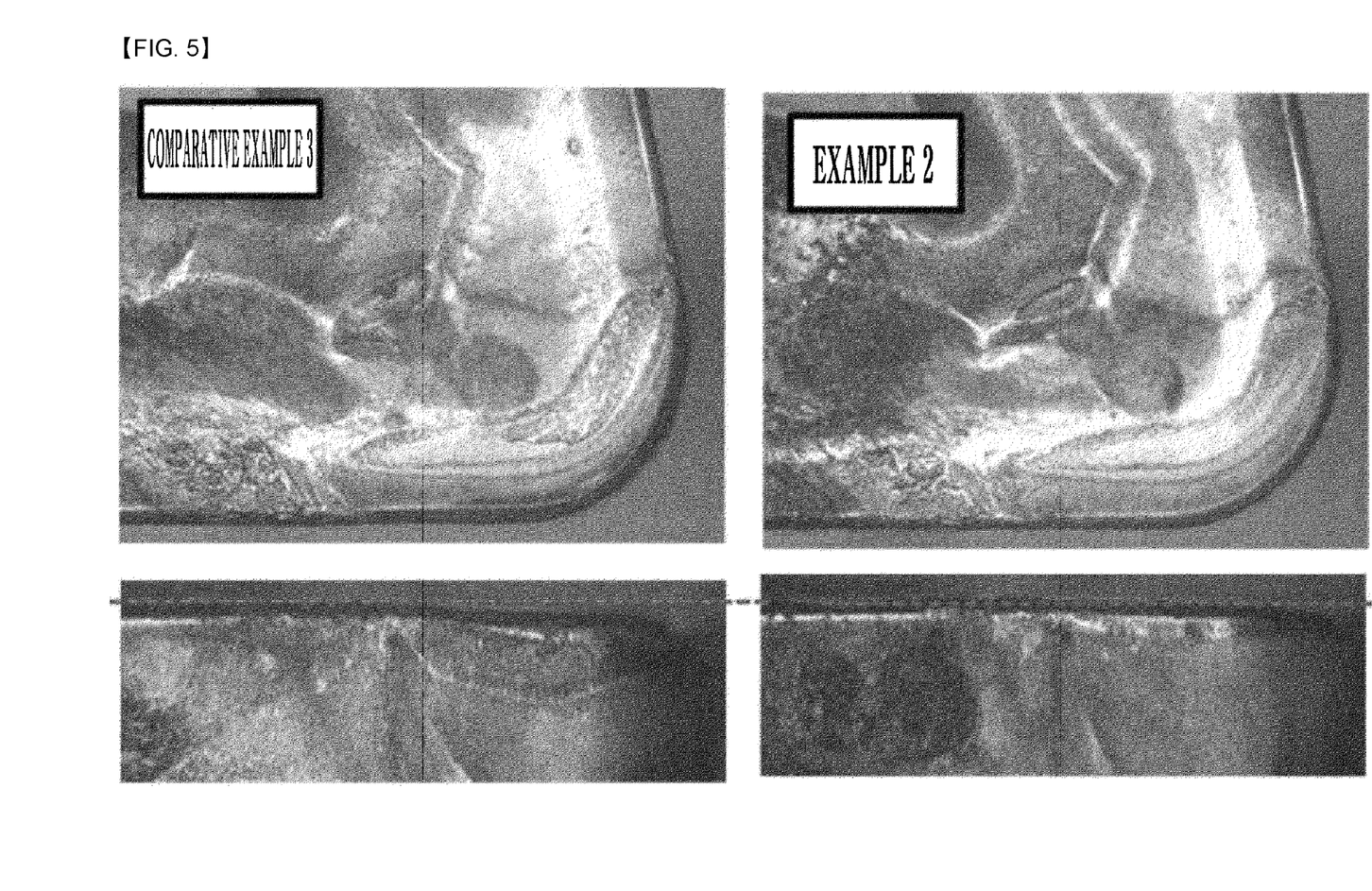
FIG. 5 is images of cutting tools subjected to machining performance tests after hard films are respectively formed on the cemented carbide base material according to Example 2 of the invention and the cemented carbide base material according to Comparative Example 3.

(1) Carbon Steel Wear Resistance Machining Condition
  Machining Method: turning
  Workpiece: SM45C (continuous machining of outer diameter)
  Vc (machining speed): 300 mm/min
  fn (feed rate): 0.35 mm/min
  ap (depth of cut): 2 mm, wet
(2) Alloy Steel Wear Resistance Machining Condition
  Machining Method: turning
  Workpiece: SCM440 (continuous machining of outer diameter)
  Vc (machining speed): 260 mm/min
  fn (feed rate): 0.25 mm/min
  ap (depth of cut): 2 mm, wet
(3) Carbon Steel Impact Resistance Machining Condition
  Machining Method: turning
  Workpiece: SM45C-V groove (interrupted machining of outer diameter)
  Vc (machining speed): 230 mm/min
  fn (feed rate): 0.2 mm/min
  ap (depth of cut): 2 mm, wet FIG. 5 illustrates states of the cutting inserts prepared according to Comparative Example 3 (left photo) and according to Example 2 of the invention (right photo) after the machining tests. As illustrated in FIG. 5, with respect to Comparative Example 3, side wear and plastic deformation tended to occur at the same time, but, with respect to Example 2 of the invention, its life was ended only by side wear.

Results of the above-described machining performance tests are presented in the following Table 1.

TABLE 1

| | CFL | | | Carbon steel wear resistance | | Alloy steel wear resistance | | Impact resistance | |
|---|---|---|---|---|---|---|---|---|---|
| Sample | Thickness (μm) | Surface | Base material | Time (min) | Lifetime trend | Time (min) | Lifetime trend | Time (min) | Lifetime trend |
| Example 1 | 20 | 85 | 79 | 28 | Side wear | 25 | Side wear | 25 | Breakage |
| Example 2 | 30 | 83 | 77 | 26 | Side wear | 23 | Side wear | 30 | Breakage |
| Comparative Example 1 | 20 | 52 | 69 | 24 | Side wear | 19 | Side wear | 20 | Breakage |
| Comparative Example 2 | 20 | 55 | 68 | 18 | Side wear plastic deformation | 10 | Side wear plastic deformation | 17 | Wear |
| Comparative Example 3 | 30 | 49 | 70 | 20 | Side wear | 17 | Side wear | 22 | Breakage |
| Comparative Example 4 | 30 | 52 | 71 | 18 | Side wear plastic deformation | 10 | Side wear plastic deformation | 20 | Wear |

*Surface: a ratio (%) of the Co content of the surface to the maximum Co content of the CFL
*Base material: a ratio (%) of the Co content of the inside of the base material (portion in which the Co content became constant) to the maximum Co content of the CFL As illustrated in Table 1, it may be understood that, with respect to the cemented carbides according to the embodiment of the invention, the difference in the Co content in the CFL was significantly reduced in comparison to that of the comparative examples.

Machining Test Results

In order to compare machining performances of the cutting tools, in which the base materials and the hard films according to Examples 1 and 2 of the invention were formed, and the cutting tools according to Comparative Examples 1 to 4, inserts were prepared, and machining As illustrated in Table 1, with respect to the cutting tools according to Examples 1 and 2 of the invention under the wear resistance machining condition of steel, it may be understood that excellent properties in terms of wear resistance and plastic deformation characteristics of the carbon steel and alloy steel were obtained in comparison to Comparative Examples 1 to 4. That is, it may be understood that Examples 1 and 2 of the invention had good impact resistance (toughness) while exhibiting excellent wear resistance characteristics in comparison to Comparative Examples 1 to 4.

The invention claimed is:
1. A cutting tool comprising:
a base material which includes
- first particles including a tungsten carbide (WC) as a main component,
- a binder phase including cobalt (Co) as a main component, and
- second particles including a carbide or a carbonitride of at least one selected from the group consisting of Group 4b, 5b, and 6b elements, or a solid solution thereof; and a hard film formed on the base material,
wherein the hard film comprises at least an alumina layer,
wherein a cubic phase free layer (CFL), in which the carbide or the carbonitride is not formed, is formed from a surface of the base material to a depth of 10 μm to 50 μm,
wherein a difference between a maximum cobalt (Co) content of the CFL and a cobalt (Co) content of the surface of the base material is within 20%,
wherein the difference between the maximum cobalt (Co) content of the CFL and the cobalt (Co) content of the base material is within 25%.

2. The cutting tool of claim 1, wherein the base material comprises 1.5 wt % to 20 wt % of the carbide or the carbonitride including at least one of tantalum (Ta), niobium (Nb), and titanium (Ti), 1 wt % to 12 wt % of the cobalt Co, and the WC as well as unavoidable impurities as a remainder.

3. The cutting tool of claim 1, further comprising a $TiC_xN_yO_z$ layer (x+y+z=1) having a structure of one or more layers between the base material and the alumina layer.

* * * * *